Feb. 27, 1968   H. B. ANDERSON   3,371,185
ELECTRON BEAM MAINTENANCE DEVICE
Filed Oct. 5, 1964   4 Sheets-Sheet 1
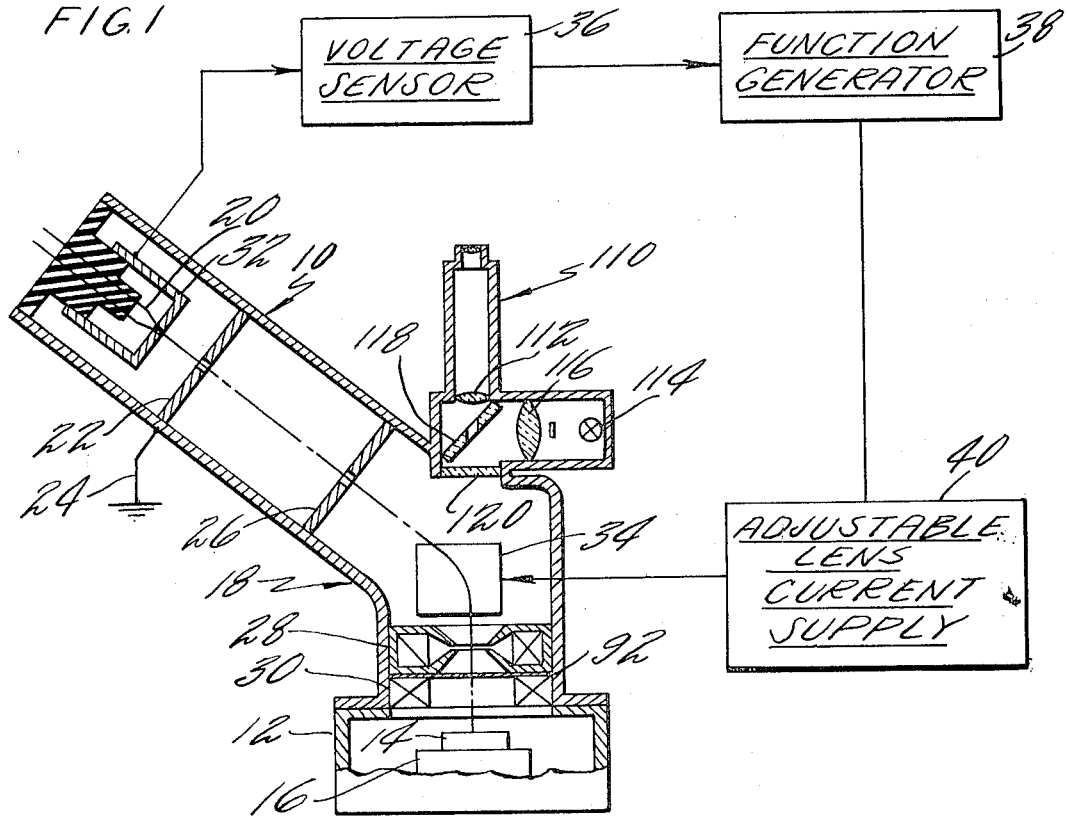
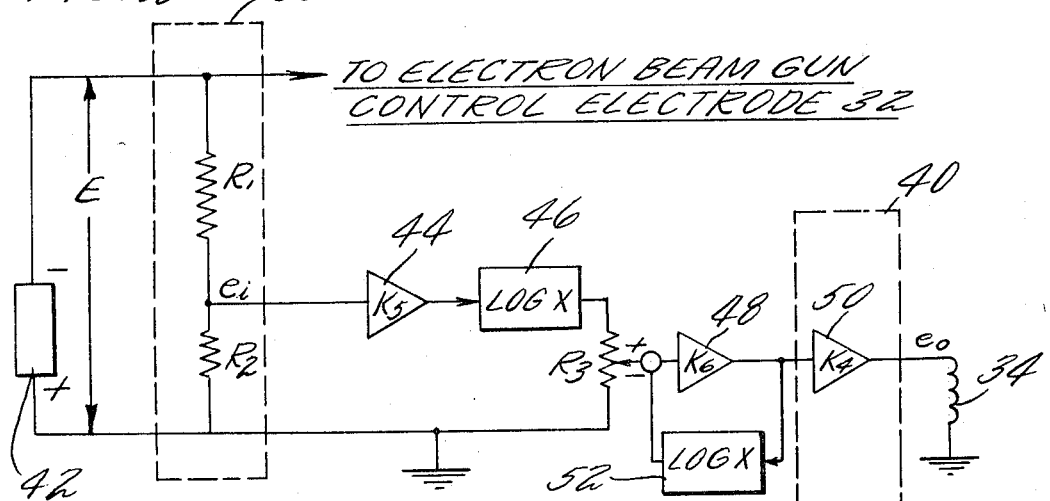
INVENTOR
HARRY B. ANDERSON
BY Roger A. Van Kirk
ATTORNEY

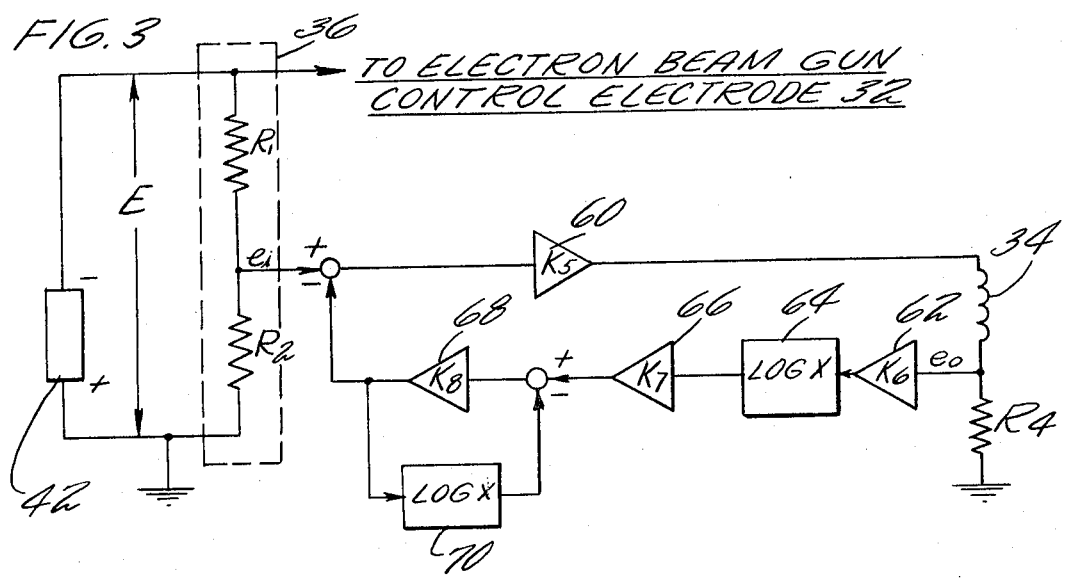
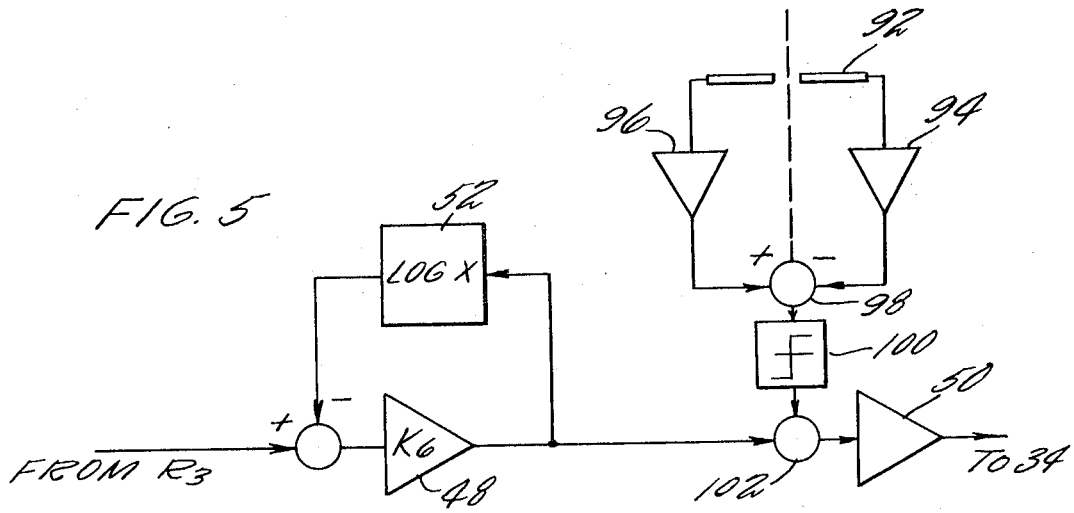

Feb. 27, 1968   H. B. ANDERSON   3,371,185
ELECTRON BEAM MAINTENANCE DEVICE
Filed Oct. 5, 1964   4 Sheets-Sheet 4
FIG. 6
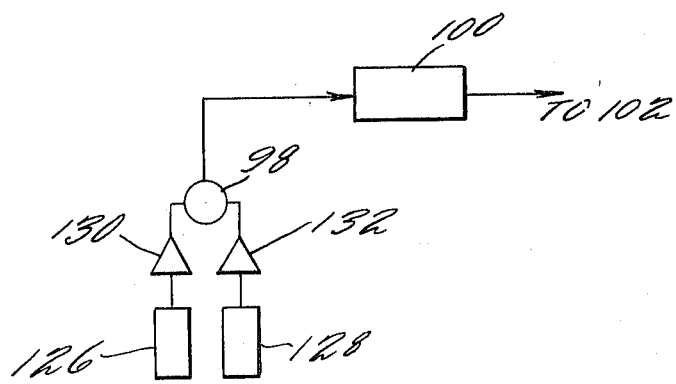
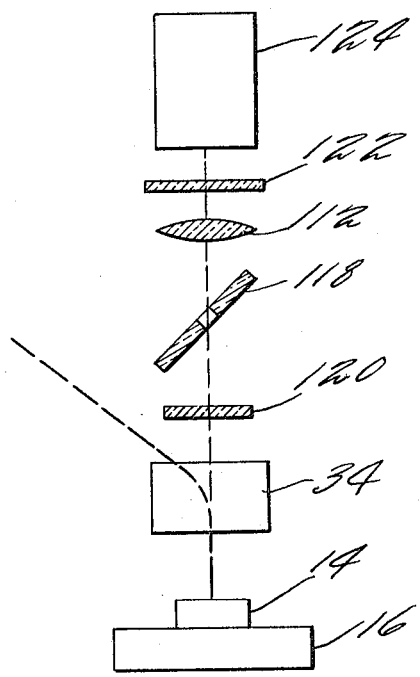
INVENTOR
HARRY B. ANDERSON
BY Roger A. Van Kirk
ATTORNEY

3,371,185
ELECTRON BEAM MAINTENANCE DEVICE
Harry B. Anderson, Wapping, Conn., assignor to United Aircraft Corporation, East Hartford, Conn., a corporation of Delaware
Filed Oct. 5, 1964, Ser. No. 401,501
20 Claims. (Cl. 219—121)

This invention relates to the working of materials with a beam of charged particles. More particularly, this invention relates to performing operations such as welding, cutting, melting, evaporating or machining on any material with an electron beam.

Devices which use the kinetic energy of an electron beam to work a material are presently commercially available. Such devices are generally known as electron beam machines. U.S. Patent No. 2,987,610, issued June 6, 1961, to K. H. Steigerwald, discloses such as a machine. These machines operate by generating a highly focused beam of electrons. The electron beam is a welding, cutting and machining tool which has practically no mass but has high kinetic energy due to the fact that high momentum is imparted to the electrons. Transfer of this kinetic energy to the lattice electrons of the workpiece generates higher lattice vibrations which cause an increase in the temperature within the impingement area sufficient to accomplish work. As taught by the above-mentioned Steigerwald patent, if the intensity or power per unit area of the electron beam is caused to exceed a threshold value, which value depends upon the material being worked, the beam of electrons will penetrate deeply into the work. Coincident with this deep penetration will be a direct energy transfer, along the entire depth of penetration of the beam, of the kinetic energy of the electrons to the work. This direct energy transfer will result in the melting of a fusion zone having a high depth-to-width ratio without reliance on thermal conduction through the work.

Among the advantages of using an electron beam or the like are inertialess control and great energy concentration. Due to this great energy concentration, a small percentage of the workpiece material will be vaporized. The molecules of metal vapor formed at the point of impingement of the electron beam on the work will travel in a straight line until they impinge upon a solid object. This, of course, is occasioned by the fact that electron beam material working is generally performed in an evacuated chamber. In the prior art, particularly when welding materials such as aluminum, considerable inconvenience and difficulty has been occasioned by arc-over in the electron gun. The potentials applied to the electron guns in machines available today are universally in excess of 50,000 volts. One of the primary causes of arc-over in the gun has been condensation of metallic vapors formed during a welding or machining process on insulating members therein. The condensed vapors contaminate the gun by causing breakdown of the insulating characteristics of the spacers therein.

To avoid this arc-over problem, it is desirable to protect the electron gun region from contaminating metal vapors. Numerous schemes to achieve this protection have been attempted without success. Since, as indicated above, molecules of metal vapor emanating from the beam impingement point on the work travel in a straight line in a vacuum, the foregoing problem may be overcome by incorporating a bend in the electron beam column so that the gun region is completely shadowed from the workpiece. As shown in FIGURE 7 of U.S. Patent No. 2,944,172, issued July 5, 1960, to W. Opitz et al., it has previously been suggested, although for entirely different purposes, to provide an electron beam machine with a bent column. However, bending the beam of charged particles by passing it through the field of an electromagnet precipates a new problem. Since the angle through which a charged particle will be bent is a function of its mass and velocity, considering a given constant bending field strength, bending the beam results in a substantial control problem. That is, since the velocity of the electrons is in turn a function of the acceleration voltage, the beam impingement point on the work will vary with changes in acceleration voltage. Except for power supplies which are so complex that their cost exceeds that which is economically practical, the acceleration voltage will vary with changes in line voltage, temperature, beam current and the like.

This invention overcomes the above-mentioned contamination problems by providing an electron beam machine employing a bent electron optical column and means for maintaining the angle through which the beam is bent constant with changes in line or acceleration voltage.

It is therefore an object of this invention to eliminate the problem of contamination of an electron gun by vapors emanating from the point of impingement of the electron beam generated thereby on a target.

It is also an object of this invention to automatically maintain constant the angle through which a beam of charged particles is bent.

It is another object of this invention to maintain a constant beam impingement point in an electron beam machine employing a bent beam to work materials.

It is yet another object of this invention to directly measure the governing parameter and to modify the bending force on an intense beam of charged particles in accordance therewith to permit continued operation within narrow dimensional tolerances over a wide range of particle acceleration potentials.

It is a further object of this invention to bend an electron beam at some fixed angle after the electrons have received their final acceleration and to maintain the radius of curvature constant throughout the operating voltage range of the electron gun.

These and other objects of this invention are accomplished by sensing the beam acceleration voltage in an electron beam machine which employs a magnetic field, normal to the axis of the generated beam, to bend a beam of charged particles through an angle whereby positioning of the electron gun in other than a straight line path from the beam impingement point is permitted. A signal commensurate with the sensed quantity is thereafter employed, by means of novel circuitry, to control the current through the lens which bends the beam in such a manner that the radius of curvature of the beam remains constant with changes in the sensed quantity.

This invention may be better understood and its numerous advantages will become apparent to those skilled in the art by reference to the accompanying drawing wherein like reference numerals apply to like elements in the various figures and in which:

FIGURE 1 is a schematic showing of this invention.

FIGURE 2 is a block diagram of a first embodiment of the function generator of FIGURE 1.

FIGURE 3 is a block diagram of a second embodiment of the function generator of FIGURE 1.

FIGURE 5 is a first embodiment of an over-ride control which may be used with the apparatus of FIGURE 1.

FIGURE 6 is a second embodiment of an over-ride control which may be used with the apparatus of FIGURE 1.

Figure 4:
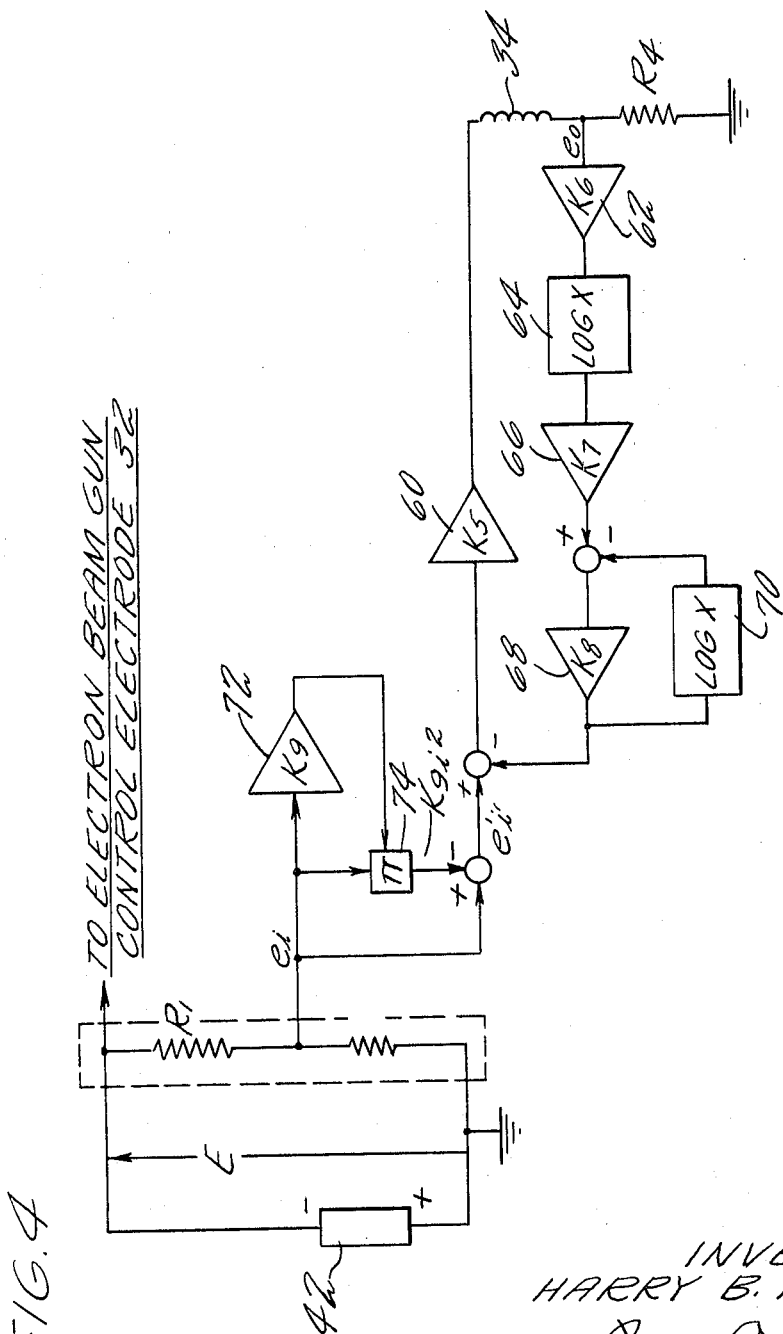
FIGURE 4 is a block diagram of the third embodiment of the function generator of FIGURE 1.

Referring now to FIGURE 1, an electron beam machine is indicated generally at 10. The machine consists of an evacuated work chamber 12 containing a workpiece 14 positioned on a table 16. The machine also comprises a bent electron beam column indicated generally at 18.

As clearly shown in above-mentioned Steigerwald Patent No. 2,987,610, beam column 18 contains a source of electrons, beam forming means and beam focusing means. The source of electrons comprises a directly heated cathode or filament 20 which has a negative voltage applied thereto. An apertured anode 22 is positioned in column 18 between the cathode and the workpiece. The anode is connected to the case of the machine which is grounded at 24. The electrons emitted by cathode 20 are accelerated down column 18 and pass through the aperture in anode 22. The accelerated electrons are thereafter focused into a beam by an electron optical system comprising adjustment coils, not shown and a series of diaphragms only one of which 26 is shown. After passing through diaphragm 26 the beam is bent through a predetermined angle and then passes between the poles of a magnetic lens assembly 28 which focuses it at the desired level. Under operating conditions the focused beam impinges upon workpiece 14 and its kinetic energy is transferred thereto. The workpiece 14 can be moved beneath the beam by moving table 16 and/or the beam may be deflected over the workpiece by means of varying the current to deflection coils 30. Positioned adjacent to cathode 20 is a control electrode 32. This control electrode is normally maintained at a voltage which is more negative than the voltage applied to the cathode. The magnitude of this bias or voltage difference is variable by adjusting a bias voltage control not shown. The control electrode, while aiding in the focusing of the beam, performs the same function as the grid in an ordinary triode vacuum tube to control beam current. It must also be observed that the full electron acceleration potential will be applied between control electrode 32 and grounded anode 22.

In accordance with a preferred embodiment of this invention, prior to passing through the magnetic lens assembly 28, the beam of electrons is caused to pass through a field generated by an additional magnetic lens assembly 34. The field generated by lens assembly 34 will cause the beam generated in column 18 to be bent in such a manner that its normal or undeflected axis will be perpendicular to the surface of workpiece 14. As is well known, the radius of curvature of a charged particle traveling through a magnetic field may be expressed by the formula:

(1) $r = mv_n/\beta g$ where $m$ = the mass of the particle
$v_n$ = the velocity of the particle
$\beta$ = the magnetic field strength
$g$ = the charge on the particle (2) $$v_n = v \text{ initial} + \sqrt{\frac{2EgK}{md}}$$

where $E$ = the particle acceleration potential

From the foregoing, and since it has been found proper to assume that the average initial velocity of the electrons emitted by cathode 20 is zero, it may be seen that the radius of curvature is effected by three variables: the mass of the electrons, the acceleration voltage and the field strength. From the foregoing, and especially from Equations 1 and 2, it becomes apparent that the radius of curvature may be maintained constant by generating a signal proportional to the acceleration voltage and utilizing this signal, with correction for changes in mass due to velocity in accordance with Einstein's Theory of Relativity, to control the current through the magnetic lens which bends the beam. Since the typical electron beam machine operates, as shown, with a grounded anode, the acceleration voltage is, as mentioned above, the negative voltage applied to the control electrode. In the apparatus of FIGURE 1, the voltage applied to control electrode 32 is sensed in a voltage sensor 36 and applied to a function generator 38. Various embodiments of function generator 38 will be discussed in detail below. The output of function generator 38 is a control voltage dependent upon the instantaneous potential through which the electrons have been accelerated and, if desired, compensated for relativistic changes in the mass of the electrons. This control voltage is applied to an adjustable lens current supply 40 which provides the current for magnetic lens 34.

Considering now FIGURE 2, there is shown a first embodiment of a function generator which may be employed in the apparatus of FIGURE 1. In the embodiment of FIGURE 2, relativistic effects are ignored. Thus, the velocity of the electrons becomes:

(3) $\quad v_n = K_1 \sqrt{E}$

Maintaining $r$ constant and substituting Equation 3 in Equation 1

(4) $$\beta = K_2 \sqrt{\frac{E}{r}} \frac{m}{g}$$

Since relativistic effects are being ignored and $r$ maintained constant, this expression reduces to:

(5) $\quad \beta = K_3 E^{1/2}$

Also, since $\beta$ is proportional to the lens current, $I_L$, for constant radius $r$, (6) $\quad I_L = K_4 E^{1/2}$ From Equation 6 it may be seen that the basic problem is that of generating a square root function with sufficient accuracy and rapidly enough to keep the impingement point of the bent but undeflected beam constant. In FIGURE 2, the high voltage supply for the electron beam machine is indicated at 42. The negative terminal of this supply is connected directly to control electrode 32 of the machine. The negative terminal of supply 42 is also connected, through a bias control, not shown, to the cathode 20 of machine 10. A suitable bias voltage control is disclosed in copending application Serial No. 214,313, filed Aug. 2, 1962, by John A. Hansen and assigned to the same assignee as this invention. A voltage divider comprised of resistors R1 and R2 is connected across source 42 and thus serves the function of voltage sensor 36 of FIGURE 1. A voltage $e_1$ proportional to the acceleration voltage, E, will appear at the junction between resistors R1 and R2. Voltage $e_1$ is amplified in an amplifier 44 the output of which is applied to a log circuit 46. The output of circuit 46 will appear across potentiometer R3. In the example being described, wherein a square root function is being generated, R3 will function as an attenuator and the movable tap thereon will be adjusted to select a signal equal to one-half of the output voltage of log circuit 46. However, it must be noted that the position of the movable tap on potentiometer R3 may be slightly readjusted in order to make an approximate correction for the change in mass of the electrons due to their velocity. The voltage appearing at the tap on potentiometer R3 is amplified in amplifier 48 and applied to the input of amplifier 50. Located in the feedback path around amplifier 48 is a second log circuit 52. Thus, amplifier 48 and log circuit 52 function as an antilog circuit. Amplifier 50 is a current amplifier and accordingly functions as adjustable lens current supply 40. The function generator of FIGURE 2 solves the following expression:

(7) $\quad I_L = e_o/R_L$ where $R_L$ = the resistance of lens 34

However, from FIGURE 2, (8) $\quad e_o = K'_4 \text{ antilog } (K_5 a \log e_1)$ Further, as noted above, $a = \frac{1}{2}$.
Thus, Equation 8 may be rewritten as:

(9) $\quad e_o = K'_4 (K_5 e_1)^{1/2}$ $\qquad = K'_4 \left( K_5 E \frac{R_2}{R_1 + R_2} \right)^{1/2}$ Accordingly $$(10) \quad I_L = \frac{K'_4}{R_L}\sqrt{K_5 E \frac{R_2}{R_1+R_2}}$$
$$= K\sqrt{E}$$

and Equation 6 is satisfied.

The function generator of FIGURE 2 is entirely open loop and may be improved by resort to the circuitry of FIGURE 3. That is, the same square root relationship may be obtained by utilizing a current feedback loop. Use of feedback, in this instance closing the minor loop, obviously achieves better control over the output current. The gain of the circuit may be expressed as:

$$(11) \quad \frac{e_o}{e_i} = \frac{K_5}{1+\text{antilog }(K_7 \log K_6 X)K_5}$$

But, $K_5 \gg 1$. Therefore $$(12) \quad \frac{e_o}{e_i} = \frac{1}{\text{antilog }(K \log K_6 X)}$$

And $$(13) \quad e_i = \text{antilog }(K_7 \log K_6 e_o)$$

Choosing $K_7$ to be 2

$$(14) \quad e_i = (K_6 e_o)^2$$
$$= (K_6 I_L R_4)^2$$

And, since $$e_i = \frac{R_1+R_2}{R_2} E$$

$$(15) \quad E = \left(\frac{R_2}{R_1+R_2}\right)(K_6 I_L R_4)^2$$
$$= K I_L^2$$

Or $$(16) \quad I_L = K\sqrt{E}$$

and Equation 6 is again satisfied. Thus, in order to achieve the foregoing, the gain of amplifier 66 in the feedback loop around amplifier 60 is chosen as 2. As in the embodiment of FIGURE 2, amplifier 68 and log circuit 70 form an antilog circuit which operates on the amplified output of log circuit 64.

In order to provide extremely high accuracy, the function generator may be designed to compensate for the relativistic effects. In accomplishing the foregoing, the basic equation to be satisfied by function generator 38 is modified by the change in mass due to acceleration. Derivation of the equation to be solved is as follows:

$$(1) \quad r = mv/\beta g$$

where $v = v_n$ for low velocities
Also, $$(17) \quad v_n = \sqrt{\frac{2gE_{10}{}'}{m_o}}$$

where $m_o$ = rest mass
From the relativity theory, $$(18) \quad m = \frac{m_o}{\sqrt{1-\frac{v^2}{c^2}}}$$

where $c$ = the velocity of light

The system energy $W$ may be expressed as:

$$(19) \quad W = mg^2$$

$$\omega = gE_{10}{}' + m_o c^2$$

Therefore $$(20) \quad gE_{10}{}' = mc^2 - m_o c^2$$

Substituting (12) into (20), $$(21) \quad gE_{10}{}' = m_o c^2 \left[\frac{1}{\sqrt{1-\frac{v_2}{c^2}}} - 1\right]$$

Solving for $v$, the true velocity, it may be shown that:

$$(22) \quad v = c\left[1 - \left(\frac{v_n^2}{2c^2}+1\right)^{-2}\right]^{1/2}$$

Using binominal expansion, $$(23) \quad v = v_n\left(1 + \frac{3}{8}\frac{v_n^2}{c^2}\right)$$

which is a first order correction applied to Equation 1 to provide partial correction for the relativistic effects. That is, by employing circuitry as shown in FIGURE 4, compensation for first order velocity error will be made automatically as the acceleration voltage varies. Referring again to Equation 1, it may be seen that:

$$(24) \quad \beta = mv/rg$$

Substituting (23) in (24), $$(25) \quad \beta = \left(\frac{m}{rg}\right)(v_n)\left(1+\frac{3}{8}\frac{v_n^2}{c^2}\right)$$

Or $$(26) \quad I_L = Kv_n\left(1+\frac{3}{8}\frac{v_n^2}{c^2}\right)$$

Substituting (17) into (26)

$$(27) \quad I_L^2 = KE\left(1+\frac{3}{8}K\frac{E}{c^2}\right)$$

Or $$(28) \quad I_L = K\left(E+\frac{3}{8}K\frac{E^2}{c^2}\right)^{1/2}$$

In FIGURE 4, the function generator comprised of amplifier 72 and multiplication circuit 74 provides the requisite correction of the input signal to function generator previously described in the discussion of FIGURE 3.

It must be noted that, in all of the systems disclosed above, the total control loop is left open and, accordingly, close control of the final beam impingement point is not secured. As shown in FIGURES 5 and 6, two over-ride controls may be incorporated to close the total control loop. In FIGURE 5, one of these over-ride controls is shown incorporated into the function generator of FIGURE 2. However, it is to be understood that either or both may be employed with the function generators of FIGURES 3 and 4 in a like manner. Referring back to FIGURE 1, it may be seen that a limiting diaphragm 92 is positioned in electron optical column 18 downstream of the magnetic lens assembly 28. Diaphragm 92 is segmented into at least two insulated portions. Respectively attached to these portions, as shown in FIGURE 5, are amplifiers 94 and 96. The outputs of amplifiers 94 and 96 are applied to a difference circuit 98. The difference signal from circuit 98 is applied to a gating circuit 100. When the difference signal exceeds a threshold value indicative of a condition where a substantial portion of the beam is impinging on any of the segments of diaphragm 92, an over-ride signal will be passed by switching circuit 100. This over-ride signal is applied to a summing junction or addition circuit 102 and is combined with the lens current control signal provided to amplifier 50 by the function generator. Since amplifiers 94 and 96 provide opposite polarity signals, the control signal will either be added to or subtracted from the $I_L$ control signal provided to amplifier 50 as necessary and will thus cause the beam to swing back into proper position.

A second over-ride control which may be used either independently or in conjunction with the control shown in FIGURE 5 is disclosed in FIGURE 6. The over-ride control of FIGURE 6 makes use of the optical viewing system of the electron beam machine as shown in FIG- URE 1. This optical viewing system, indicated generally at 110, comprises means for viewing the workpiece by looking along the beam axis. For this purpose, there is provided a microscope including an objective lens 112 which permits the operator to view the work by looking down through an apertured mirror 118, magnetic lens 28, assemblies 34 and, apertured diaphragm 92. In order to illuminate the workpiece, a light source 114 is provided. The light from source 114 passes through a lens 116 and is reflected by apertured mirror 118 to the work. Positioned between optical viewing system 110 and the electron beam column is a leaded glass window 120 which protects tthe operator from X-rays emanating from the beam impingement point. Means, not shown, may be provided inside the electron optical column 18 for preventing the clouding of window 120 caused by condensation of metal vapors thereon. Considering again FIGURE 6, the over-ride control disclosed may be permanently or temporarily inserted in the microscope portion of the optical viewing system above objective lens 112. In a preferred embodiment, the device of FIGURE 6 and the visual optics may be turret mounted so that either may be rotated into position. The device of FIGURE 6 comprises an infrared detector aligned to see the beam impingement point through objective lens 112. This detector comprises a filter 122 which passes only light of the desired wave length to an image converter 124. The image appearing on image converter 124 is sensed by a pair of photocells 126 and 128 and supplied thereto to respective amplifiers 130 and 132. The output of amplifiers 130 and 132 are opposite polarity signals which are applied to summing circuit 98 and from thereto gating circuit 100. Deviations of the beam impingement point from the preselected point results in an unbalance of the signals generated by photocells 126 and 128 and amplifiers 130 and 132 in return generate a corrective signal which may be added to the input signal to amplifier 50 in such a manner as to cause adjustment of the beam impingement point to its desired position. If deemed necessary, sufficient anticipation can be built into the circuit to assure extremely fine control of the current through lens 34.

While a preferred embodiment has been shown and described, various modifications and substitutions may be made without deviating from the scope and spirit of my invention. Thus, my invention is described by way of illustration rather than limitation and accordingly it is understood that my invention is to be limited only by the appended claims taken in view of the prior art.

I claim:
1. Apparatus for working materials with a beam of charged particles comprising:
    a source of charged particles,
    means for accelerating the particles provided by said source through a potential,
    means for collimating the accelerated particles into a beam,
    means for producing a magnetic field in the path of said beam whereby said beam is caused to be bent through an angle,
    means supporting a workpiece in a plane perpendicular to the normal axis of the bent beam,
    means electrically connected to said accelerating means for sensing the particle acceleration potential and for generating a signal commensurate therewith,
    means responsive to said signal commensurate with acceleration potential for generating a control signal which is a function thereof, and
    means responsive to said control signal for varying the strength of the beam bending field produced by said magnetic field producing means in such a manner that the point of impingement on the work will remain constant with changes in particle acceleration potential.

2. The apparatus of claim 1 wherein said means for generating a control signal comprises:
    means responsive to said signal commensurate with acceleration potential for generating a signal which is a function of the square root thereof.

3. The apparatus of claim 2 wherein said square root function generator further comprises:
    second means responsive to said signal commensurate with acceleration potential for modifying said control signal to compensate for relativistic changes in the mass of the accelerated particles.

4. Apparatus for working materials with an intense beam of electrons comprising:
    means for emitting electrons,
    a bent electron beam optical column including means for focusing electrons passing therethrough into a highly collimated beam,
    means for accelerating the emitted electrons down said column,
    a source of acceleration potential,
    means connecting the negative terminal of said source to said accelerating means,
    means in said column downstream of said focusing means for generating a magnetic field normal to the axis of the electron beam whereby the beam is caused to be bent through an angle.
    means supporting an article to be worked generally in line with the normal axis of the bent beam,
    means for sensing the negative voltage supplied by said source and for generating a signal commensurate therewith,
    means responsive to said signal commensurate with the source potential for generating a control signal which is a predetermined function thereof,
    a variable current supply having its output connected to said field generating means, and
    means applying said control signal to said variable current source whereby the strength of said beam bending field varies as a function of the acceleration voltage.

5. The apparatus of claim 4 wherein said control signal generating means comprises:
    means responsive to said signal commensurate with acceleration voltage for generating a signal which is a function of the square root thereof.

6. The apparatus of claim 4 wherein said control signal generating means comprises:
    first means responsive to said signal commensulate with acceleration potential for generating a signal which is a function of the relativistic increase in mass of the electrons due to their acceleration by the instantaneous value of the acceleration voltage, and
    second means responsive to said signal commensurate with acceleration potential and to said signal generated by said first means for generating a control signal which is a function of said acceleration potential and the instantaneous mass of the electrons.

7. The apparatus of claim 6 further comprising:
    means for sensing gross errors in the desired radius of curvature of the bent beam and for generating an override signal indicative thereof, and
    means for adding said over-ride signal to said control signal.

8. The apparatus of claim 7 wherein said gross error sensing means comprises:
    means for sensing the misaligned beam downstream of said bending field generating means, and
    means responsive to sensing means for generating an over-ride signal whose polarity varies with the direction of misalignment.

9. The apparatus of claim 8 wherein said misaligned beam sensing means comprises:
    an apertured diaphragm positioned in said column downstream of said bending field generating means and consisting of two electrically isolated segments.

10. The apparatus of claim 9 wherein said over-ride signal generating means comprises:
means respectively connected to each of the segments of said diaphragm for generating opposite polarity signals indicative of beam misalignment, and
means for combining said opposite polarity signals to provide an over-ride signal.

11. The apparatus of claim 8 wherein said misaligned beam sensing means comprises:
means for sensing the point of impingement of the best beam on the article to be worked, and
means responsive to said sensing means for generating a signal whose polarity varies in accordance with the direction of deviation of the beam impingement point from that which is desired.

12. The apparatus of claim 11 wherein said sensing means comprises:
a detector for observing the beam impingement point and for presenting an image thereof,
a pair of photosensitive means responsive to said image for generating opposite polarity signal indicative of the direction of deviation of said image from the desired point, and
means for combining said opposite polarity signals to provide an over-ride signal.

13. The apparatus of claim 5 further comprising:
means for sensing gross errors in the desired radius of curvature of the bent beam and for generating an over-ride signal indicative thereof, and
means for adding said over-ride signal to said control signal.

14. The apparatus of claim 13 wherein said gross error sensing means comprises:
means for sensing the misaligned beam downstream of said bending field generating means, and
means responsive to sensing means for generating an over-ride signal whose polarity varies with the direction of misalignment.

15. The apparatus of claim 14 wherein said misaligned beam sensing means comprises:
an apertured diaphragm positioned in said column downstream of said bending field generating means and consisting of two electrically isolated segments.

16. The apparatus of claim 15 wherein said over-ride signal generating means comprises:
means respectively connected to each of the segments of said diaphragm for generating opposite polarity signals indictaive of beam misalignment, and
means for combining said opposite polarity signals to provide an over-ride signal.

17. The apparatus of claim 14 wherein said misaligned beam sensing means comprises:
means for sensing the point of impingement of the best beam on the article to be worked, and
means responsive to said sensing means for generating a signal whose polarity varies in accordance with the direction of deviation of the beam impingement point from that which is desired.

18. The apparatus of claim 17 wherein said sensing means comprises:
a detector for observing the beam impingement point and for presenting an image thereof,
a pair of photosensitive means responsive to said image for generating opposite polarity signal indicative of the direction of deviation of said image from the desired point, and
means for combining said opposite polarity signals to provide an over-ride signal.

19. Apparatus for maintaining constant the radius of curvature of a beam of charged particles passing through a magnetic field after receiving their final acceleration comprising:
means for sensing the particle acceleration potential,
means responsive to said sensed potential for generating a signal commensurate therewith,
means responsive to said signal commensurate with acceleration potential for generating a signal commensurate with the square root thereof,
means responsive to said square root signal for producing a current which varies therewith, and
means responsive to said current for varying the strength of the magnetic field whereby the field strength varies as a function of the acceleration potential.

20. The apparatus of claim 19 wherein said means for generating a signal commensurate with the square root of the acceleration potential comprises:
means responsive to said signal commensurate with acceleration potential for generating an output voltage commensurate with field strength,
means responsive to said output voltage for generating a signal proportion to the logarithm thereof,
means for multiplying said logarithm proportional signal by a predetermined constant,
means responsive to said multiplied logarithm proportional to the antilogarithm thereof, and
means for applying said signal proportional to the antilogarithm of the multiplied logarithm signal to the input of output voltage generating means.

References Cited

UNITED STATES PATENTS

| | | | |
|---|---|---|---|
| 2,944,172 | 7/1960 | Opitz et al. | 219—121 |
| 2,987,610 | 6/1961 | Steigerwald | 219—121 |
| 3,151,231 | 9/1964 | Steigerwald | 219—121 |
| 3,196,246 | 7/1965 | El-Kareh | 219—121 |
| 3,221,133 | 11/1965 | Kazato et al. | 219—121 |

RICHARD M. WOOD, *Primary Examiner.*

W. D. BROOKS, *Assistant Examiner.*

UNITED STATES PATENT OFFICE
CERTIFICATE OF CORRECTION

Patent No. 3,371,185                      February 27, 1968

Harry B. Anderson

It is certified that error appears in the above identified patent and that said Letters Patent are hereby corrected as shown below:

Column 10, line 40, after "tional" insert -- signal for generating a signal proportional --.

Signed and sealed this 24th day of June 1969.

(SEAL)
Attest:

Edward M. Fletcher, Jr.             WILLIAM E. SCHUYLER, JR.

Attesting Officer                      Commissioner of Patents